United States Patent [19]

Newman et al.

[11] 3,742,146

[45] June 26, 1973

[54] VOWEL RECOGNITION APPARATUS

[75] Inventors: Edward Arthur Newman, Oxshott; Brian Edward Pay, Wraysbury; David Roger Manning, Morden, all of England

[73] Assignee: National Research Development Corporation, London, England

[22] Filed: Oct. 20, 1970

[21] Appl. No.: 82,348

[30] Foreign Application Priority Data

Oct. 21, 1969 Great Britain .................. 51,588/69

Oct. 21, 1969 Great Britain .................. 51,589/69

[52] U.S. Cl. ................................................ 179/1 SA

[51] Int. Cl. .............................................. G10l 1/04

[58] Field of Search ............ 179/1 SA, 1 SB, 15.55; 324/77 H; 329/145

[56] References Cited

UNITED STATES PATENTS

| | | | |
|---|---|---|---|
| 3,069,507 | 12/1962 | David | 179/15.55 R |
| 3,071,652 | 1/1963 | Schroeder | 179/15.55 R |
| 3,109,070 | 10/1963 | David | 179/15.55 R |
| 3,400,216 | 9/1968 | Newman | 179/1 SA |
| 3,428,748 | 2/1969 | Flanagan | 179/1 SA |

OTHER PUBLICATIONS

R. Purton, Speech Recognition Using Autocorrelation Analysis, IEEE Transactions, Vol. AU-16 6/1968 pp. 235-9.

K. Stevens, Autocorrelation Analysis of Speech Sounds, J.A.S.A. Vol. 22, Nov. 1950 p. 769-771.

R. Fano, Short-Time Autocorrelation Functions and Power Spectra, J.A.S.A. Vol. 22 Sept. 1950 p. 546-550.

Harper, Vowel Separation By Time Ratio Measurements, IBM Technical Disclosure Bulletin, March 1963.

Effects of Differentiation Integration, and Infinite Peak Clipping upon the Intelligibility of Speech, Licklider and Pollack, J.A.S.A., Vol. 20 Jan. 1948, p. 42-51.

Comer, The Use of Waveform Asymmetry to Identify Voiced Sounds, IEEE Transactions, Vol. AU-16 12/68 p. 500-06.

Dersch, Voiced Sound Detector, IBM Technical Disclosure Bulletin, 8/1962.

Dersch, Improved Vowel Separation for Speech Recognition Applications, IBM Technical Disclosure Bulletin, 10/1962.

*Primary Examiner*—Kathleen H. Claffy

*Assistant Examiner*—Jon Bradford Leaheey

*Attorney*—Cushman, Darby & Cushman

[57] ABSTRACT

The recognition of signals having specific periods is described particularly in relation to recognizing vowels. Characteristic frequencies in vowels are recognized by circuits which delay the input signals for an interval related to a frequency to be recognized, correlate the delayed signals with undelayed input signals and integrate the resultant over a short period comparable with the duration of the vowel sound. The magnitude and sign of the integrated signal indicates whether the required signal is present. In order to deal with speech an incoming signal is first passed to a special form of AGC circuit and then divided into low and high frequency components. The presence of characteristic frequencies in these components is determined by the technique described above, and logic circuits indicate what combinations of frequencies and thus what vowels are present.

22 Claims, 25 Drawing Figures

VOWEL RECOGNITION APPARATUS

Figure 1:
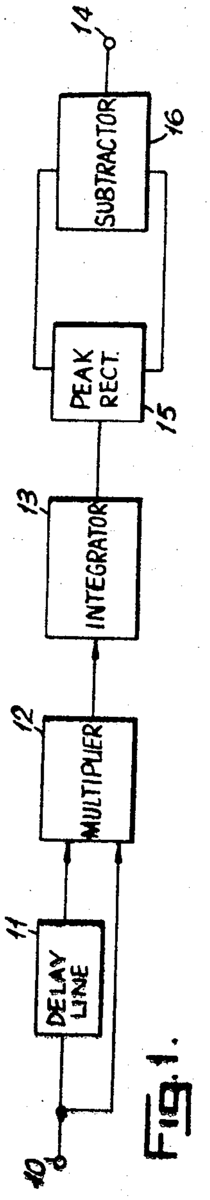

The present invention relates to detecting the presence of a signal having a predetermined period. The invention is particularly, but not exclusively, useful in analyzing complex waveforms to determine which signals are present. Such analysis is useful in speech recognition.

In the automatic recognition of vowels it has been found that each vowel sound contains two characteristic notes or formants. Two or three other formants are also present but are not necessarily characteristic of a particular vowel and are in some cases common to all vowels. Thus it is possible to recognize vowels by converting the sound waveform into an electrical waveform and then analyzing the electrical waveform to determine which formants are present. The above subject is discussed more fully in U.S. Pat. No. 3,400,216.

According to the present invention there is provided apparatus for detecting the presence of a signal having a predetermined period, including two paths for an input signal to the apparatus such that the output signal from one of the paths is delayed in relation to the output signal from the other path by a predetermined interval, correlation means for correlating the output signals from the paths to provide a correlation signal, and integration means for integrating the correlation signal over an interval which equals an integral number, including one but less than 10, times the predetermined interval.

In recognizing vowels only a few cycles of a formant may be present when each vowel is pronounced. An important advantage of the invention is that integration is carried out for a period which is comparable with the period of the formant. This allows sounds following in quick succession to be recognized where a long integration period would not.

For a signal having a particular period a graph of the integrated correlation signal against relative delay has cosine form and hence there is an infinite family of such cosine curves, one for each possible signal period. Thus only for a signal having a particular period or for harmonies of that signal, will the integrated correlation signal have a particular value corresponding to the cosine curve for that period. Harmonies can be excluded in the way mentioned below.

The means for integrating over an interval equal to the predetermined interval or an integral multiple thereof may be a resistance-capacitance circuit, the time constant of such a circuit being approximately equal to the interval over which integration is carried out.

The required signal is most easily detected if the relative delay is equal to half the period of the signal to be detected or an integral number of such half periods, since then the integrated correlation signal has a maximum negative or positive value. Further if means are provided to restrict the input signals to the apparatus to signals whose periods are greater than the relative delay, divided by one and a half, only a single maximum will occur, and that will be a negative maximum occurring when the relative delay equals half the period of the applied signal. In this way any ambiguity is avoided due to signals which have periods which are submultiples of the period of the signal to be detected.

The integrator means may integrate over an interval of a few cycles only of the signal to be detected. For example where maximum negative correlation is required the delay interval may be equal to half a period of the signal, and integration may be over the same interval or a longer interval. For recognizing vowel sounds the integrator means may be a capacitor, and the time constant of the capacitor and its associated circuit may be approximately equal to four times the period of a formant to be detected the voltage across the capacitor at any instant depends on the current received in the preceding interval of duration four formant periods, and continuous integration over this interval is carried out.

In addition to uses in speech recognition the invention is also useful where it is required to measure the frequency of a signal which occurs only a few cycles at a time and then only intermittently. Fourier analysis can be used but accuracy is low, and components, dependent on the repetition frequency at which the single cycle occurs, are present in the output.

In order to make use of the output signal provided by apparatus according to the invention, the integration means may be coupled to peak indicating means for providing first and second signals proportional to the positive and negative peak magnitudes of the signal from the integration means, and comparison means for comparing the magnitudes of the first and second signals to provide an output signal, the apparatus being such that the presence of the signal having a predetermined period is indicated by a predetermined magnitude and sign for the output signal.

The peak rectifier means may include two peak rectifier circuits and the comparison means includes a subtraction circuit for subtracting the output of one rectifier circuit from that of the other.

Preferably one of the two paths includes delay means with its output coupled to the correlation means, and there is substantially no delay to signals reaching the correlation means by the other path.

Where it is desired to analyze a complex waveform such as a waveform derived from a speech sound, the delay means may have a plurality of outputs at which the input signal to the apparatus appears delayed by an integral number of half different predetermined periods corresponding to different frequencies. Each output of the delay line is connected to separate correlation means and separate integrator, peak-rectifier and comparison means individual thereto. Each of the various comparison means provides a signal whose magnitudes indicate how near in frequency the sound is to one of the predetermined periods. Hence by logically combining the signals from the comparison means in a way determined by knowledge of the formants present in various vowel sounds, automatic vowel recognition can be achieved.

It is found in practice that formants of the same vowels vary in frequency from time to time with the same individual but in a more pronounced way with different individuals especially with different regional accents. Thus in vowel-sound recognition apparatus, including apparatus according to the invention, means are provided for determining whether the frequency falls between two boundaries defining one formant of a vowel, rather than for determining whether a frequency corresponds to a formant frequency.

In speech recognition the signals from the comparison means may vary from positive through zero to negative in indicating how near a frequency is to a particular frequency. The means for determining whether a frequency falls between two boundaries may include means for combining the signals from a plurality of the comparison means, by addition with different weightings. The frequency characteristic obtained by combining the outputs of the comparison means in this way varies from one polarity through zero to another polarity rather more sharply than the characteristic which is obtained by taking the output from a single comparison means.

If the applied signal to the apparatus for detecting a signal having a predetermined period has a rectangular waveform the delay means may be a shift register, and where a plurality of different delays are required outputs may be provided after each stage or after groups of stages.

The integrator means may also be a shift register with outputs after each or after each group of stages, these outputs being taken to summing means for providing a signal dependent on the continuous integral of the correlation signal.

Where the delay means is a shift register and the correlation means is a multiplier or divider, a logical circuit may be used as the multiplier or divider.

If the frequency of an applied signal is to be found and the delay means is a shift register, the clock frequency applied to the shift register may be varied until the integrated correlation signal has a maximum negative value. The clock frequency at that time will then be indicative of the frequency of the applied signal since the delay imparted by the delay means depends on this clock frequency.

In speech recognition and the analysis of other complex waveforms, it is desirable to use shift registers as the delay means, since they are less expensive and easier to use than delay lines. Although analogue shift registers are now becoming available, it is expected that conventional digital shift registers will be less expensive, and it is therefore an advantage to be able to change a speech waveform or complex waveform into a rectangular waveform having the same repetition frequencies.

The rectangular wave may be obtained from processing means for converting the complex waveform to a waveform in which all maxima have one polarity and all minima have the opposite polarity, and means for clipping the waveform so obtained.

The processing means may include first and second delay means coupled in series, first subtractor means for subtracting the output of the first delay means from its input, second subtractor means for subtracting the output of the second delay means from its input, and third subtraction means for subtracting the output of the first subtraction means from that of the second subtraction means.

Instead, the processing means may include a plurality of differentiating and integrating circuits connected alternately in series.

The rectangular waveform obtained from the processing means is ternary in that it has three possible levels, positive, zero and negative. Such a waveform cannot, of course, be handled by a binary shift register. Means are therefore provided for converting the ternary waveform into two rectangular waveforms: one positive going when the ternary waveform goes positive, and one positive going when the ternary waveform is negative, both binary waveforms being zero where the ternary waveform is zero. The delay means then comprises two shift registers, one for each binary signal, and subtraction means for subtracting the outputs of the shift registers to reconstitute the ternary waveform. Where the delay line has a plurality of outputs, subtraction means are provided for each output and individual thereto.

Since some people speak more loudly than others, it is preferable in speech recognition apparatus to provide means for reducing differences in speech amplitude. Hence automatic gain control (AGC) means are preferably provided before the processing means, the AGC means including control means providing a control signal dependent on the amplitude of an applied signal and a variable gain amplifier whose gain depends on the amplitude of the control signal, the control means being coupled to receive the applied signal and not the amplifier output signal.

Figure 3:
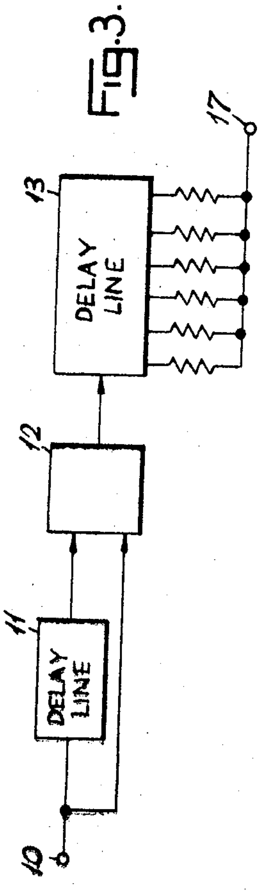
Figures 2A, 2B, 2C, 2D, 2E, 2F, 2G, 2H, 2J, 2K, 2L, 2M:
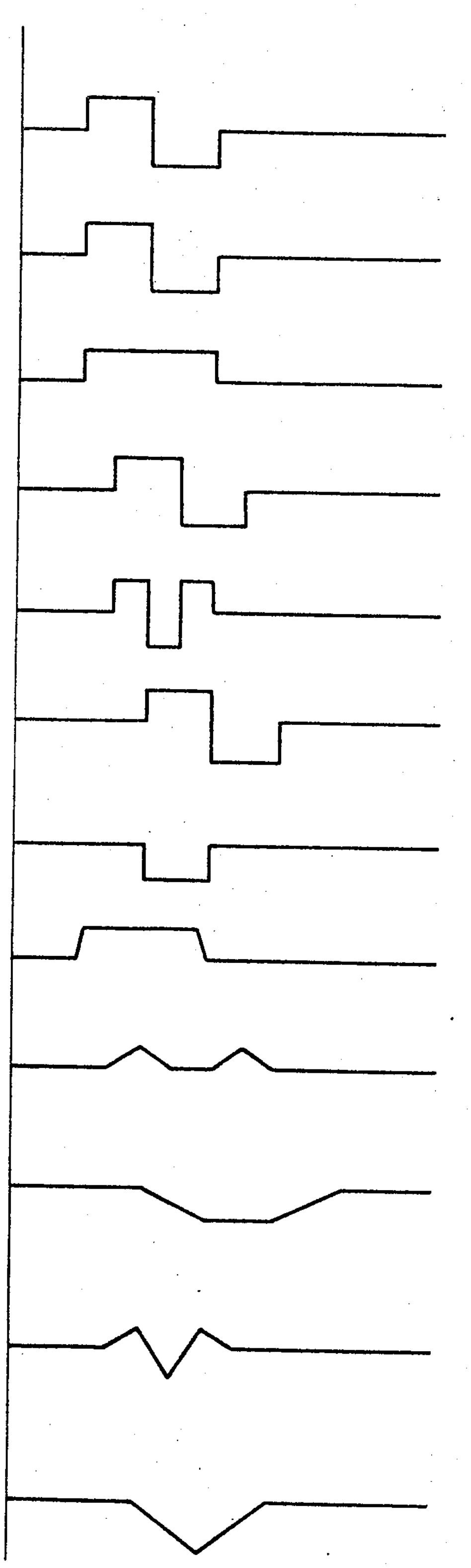
Figure 4:
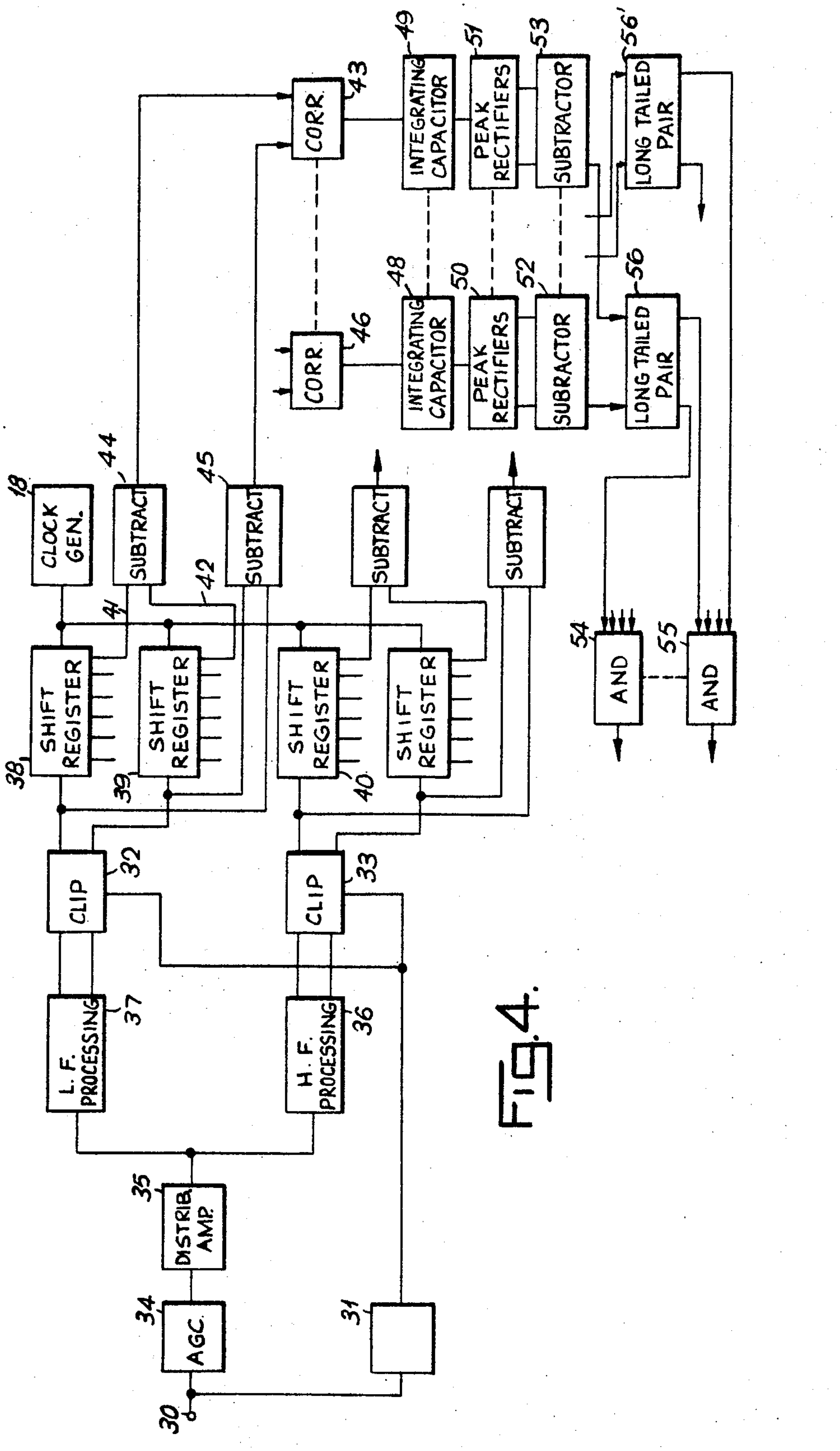
Figure 5A:
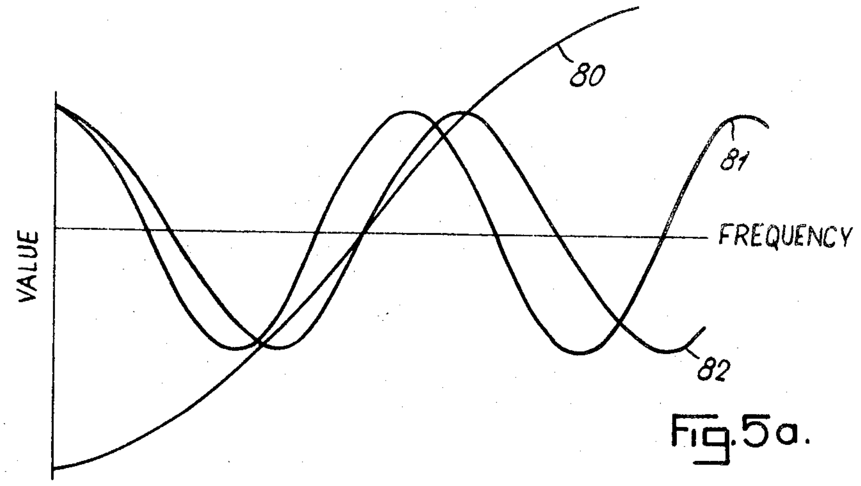
Figure 5B:
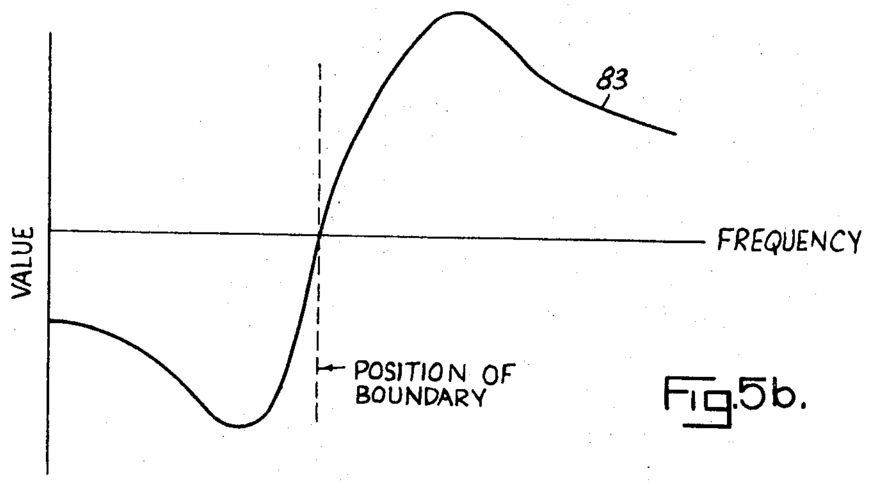
Figure 6:
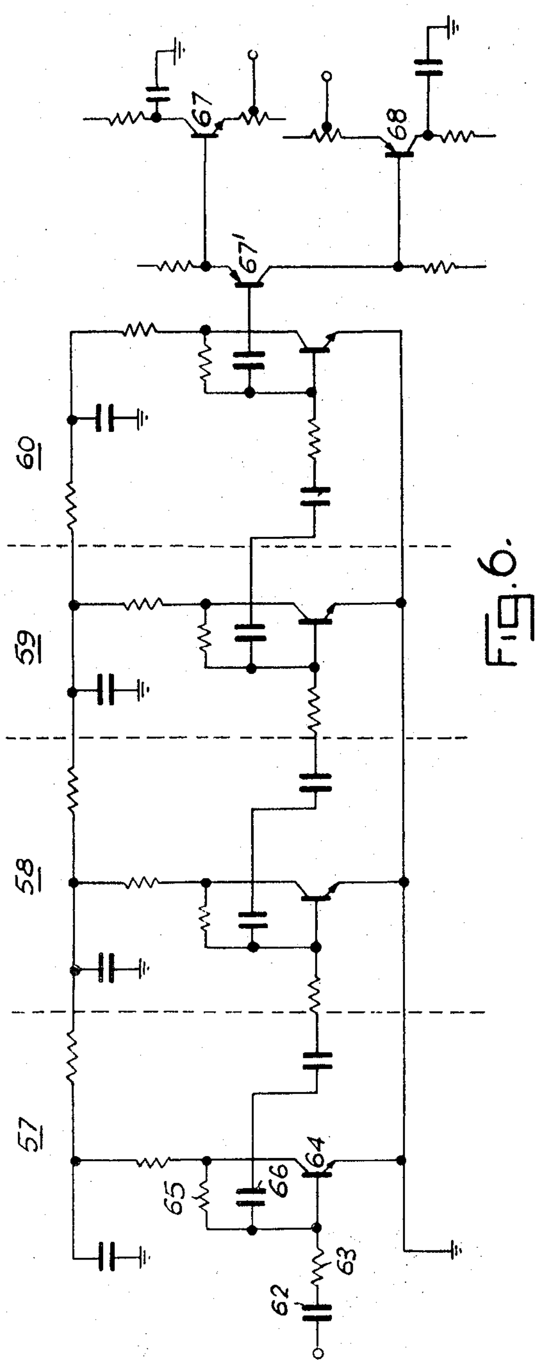
Figures 7B, 7C, 7D:
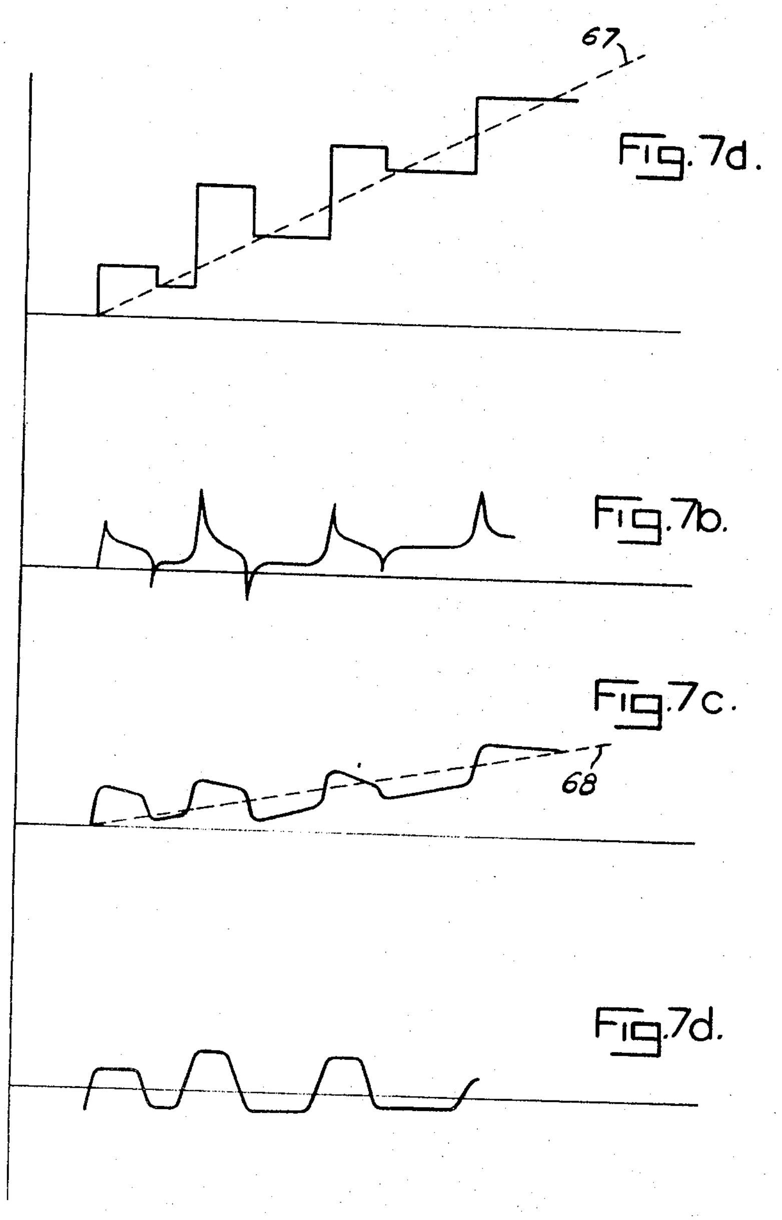
Figure 8:
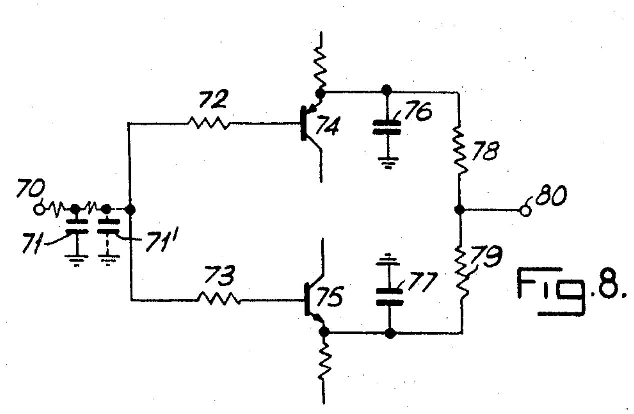
Figure 10:
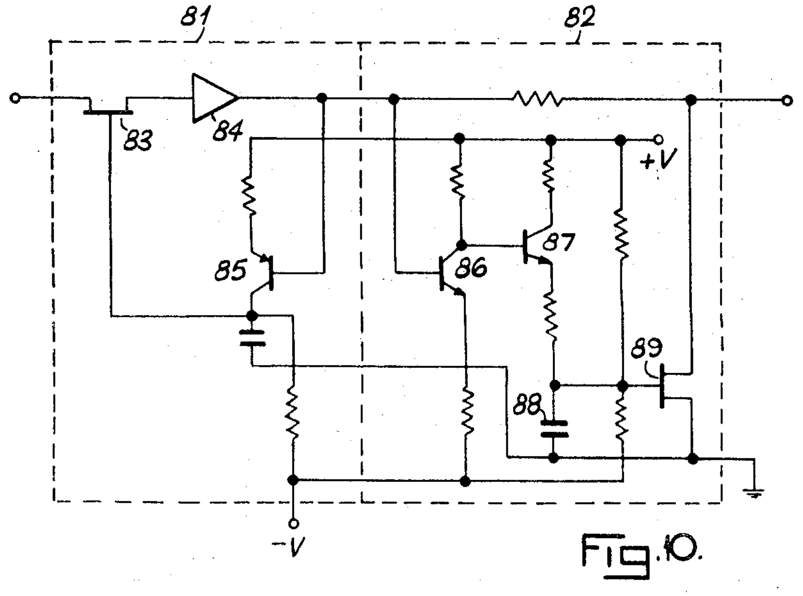
Figure 9:
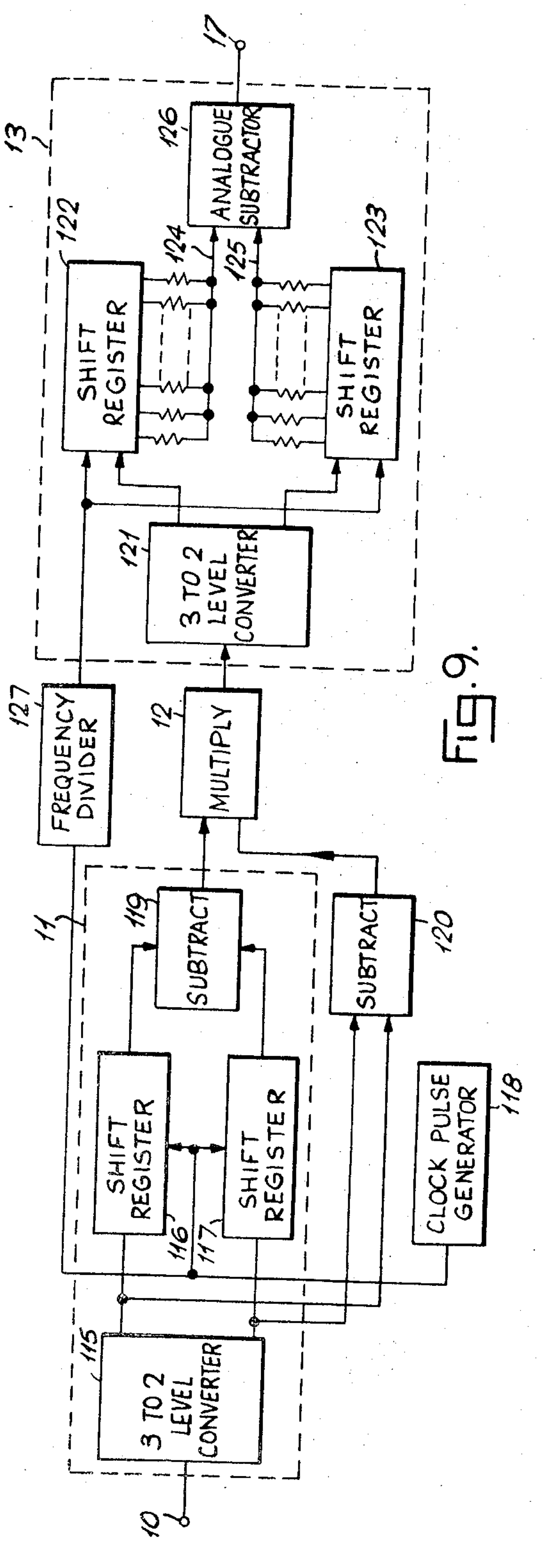

Certain embodiments of the invention will now be described, by way of example, with reference to the accompanying drawings, in which:

FIG. 1 is a block diagram of a first embodiment of the invention,

FIGS. 2(*a*) to 2(*m*) are waveforms used in explaining the operation of FIG. 1, FIG. 3 is a block diagram of a second embodiment of the invention, FIG. 4 is a block diagram of a vowel sound recognition apparatus incorporating a third embodiment of the invention, FIG. 5(*a*) shows the frequency characteristics of correlators forming part of the apparatus of FIG. 4, FIG. 5(*b*) shows the frequency characteristic obtained by combining the characteristics of FIG. 5(*a*), FIG. 6 is a circuit diagram of a processing circuit used in the apparatus of FIG. 4, FIGS. 7(*a*)–7(*d*) are waveforms used in explaining the operation of FIG. 6, FIG. 8 is a circuit diagram of integrating, peak rectifying and subtraction circuits used in the apparatus of FIG. 4, FIG. 9 is a block diagram of a fourth embodiment of the invention, and FIG. 10 is a circuit diagram of an AGC circuit used in the apparatus of FIG. 4.

In FIG. 1, a signal which is to be analyzed to determine whether it contains energy at a frequency having a predetermined period, is applied at an input terminal 10. The signal then passes to a delay line 11 having a delay $\tau$ and thence to a multiplier 12 which also receives the undelayed applied signal. An integrator 13 is coupled to peak-rectifier circuits 15 which provide two output signals proportional to the positive and negative peak magnitudes of the multiplier signal. The signals from the peak-rectifier circuits are applied to a subtractor 16 with an output terminal 14.

The integrator 13 may be a delay line with a plurality of taps as shown in FIG. 3. Each tap is taken to a summing resistor so that the integral is obtained at a terminal 17. The integration may be carried out over the interval $2\tau$ in which case the maximum delay from the delay line is also $2\tau$.

If, for example, a square waveform as shown in FIG. 2(*a*) is applied at the terminal 10 and the delay $\tau$ is much less than the period of the applied signal, then on multiplying the waveform of FIG. 2(*a*) by the waveform of FIG. 2(*b*) the wholly positive output signal of FIG. 2(*c*) is obtained at the output of the multiplier 12.

If, however, the delay $\tau$ is only equal to a quarter of the period of the applied signal as shown at FIG. 2($d$), then the output of the multiplier will have the waveform of the FIG. 2($e$). Where the delay $\tau$ equals half the period of the applied waveform, as in FIG. 2($f$), the output of the multiplier 12 is wholly negative, as shown in FIG. 2($g$).

The integrals of the correlation signals of FIGS. 2($c$), 2($e$) and 2($g$) are shown in FIGS. 2($h$), 2($j$) and 2($k$), respectively, when integrated over an interval equal to $2\tau$. After peak rectification, and the subtraction of one peak signal from the other, a signal is obtained which varies from a maximum positive value corresponding to FIG. 2($a$) to a maximum negative value corresponding to FIG. 2($k$). Thus the output signal from the subtraction circuit depends on the relationship between the period of the input signal and the delay $\tau$, the maximum negative value of the output signal being obtained when the delay equals half the period of the input signal.

Instead the integrator 13 may integrate over an interval $\tau$, when the signals of FIGS. 2($c$), 2($e$) and 2($g$) are integrated to provide the signals shown in FIGS. 2($h$), 2($l$) and 2($m$) respectively. FIG. 2($h$) is the same for integration of $\tau$ and $2\tau$ since $\tau$ is small compared with the period of the appended signal. With integration over the interval $\tau$ the output from the subtraction circuit is of the same form as when integration is over the interval $2\tau$. However while the positive and negative peaks occur at the same relative delay, a delay of quarter of a wavelength of the applied signal now gives zero output since the positive and negative peaks of FIG. 2($l$) are subtracted from one another.

As has been mentioned above, the integration may be over any integral number times the delay, i.e., the integral is:

$$\frac{2}{T}\int_{-T/2}^{+T/2} F(t)F(t-\tau)\,dt$$

where F($t$) is the input signal, $\tau$ is the delay, and $T = n\tau$, n being an integer.

In general, provided the signal which is to be delayed, correlated and integrated continues during the delay interval, the continuous integral over an interval equal to the delay interval or a multiple thereof, varies cosinusoidally with increase in frequency so that harmonics of the frequency having the period of the delay also give maximum positive outputs from the substractor corresponding to positive maxima in the cosine wave while negative peaks and zeros are given by some harmonics and some half multiples of the frequency.

In practice, if the repetition frequency of the applied signal is limited to below say $2.5f$, then a negative maximum in the correlation signal indicates that the applied repetition frequency is $f$.

The apparatus of FIG. 1 may be employed in FIG. 4 as part of apparatus for recognizing vowel sounds. A speech input signal from a microphone or a tape recorder, for example, is applied at an input terminal 30 and passes to an AGC circuit 34 in which in each overall cycle of a sound the relative magnitudes of the positive and negative excursions of the speech waveform are preserved but the maximum amplitudes of different overall cycles are of uniform value. The AGC circuit which will be described in more detail later, allows the apparatus to be operated by anybody, no matter how loudly they speak.

The use of the AGC circuit necessitates a threshold circuit 31 to prevent background noise being treated in the same way as speech. The circuit 31 operates by inhibiting two clipping circuits 32 and 33, unless the incoming sound reaches a predetermined level.

A distribution amplifier 35 distributes the output signal from the AGC circuit to a high frequency processing circuit 36 which is described in more detail later and a low frequency processing circuit 37. These two circuits separate high frequency formants above 580 cycles per second from low frequency formants below 1040 cycles per second; there is therefore a considerable overlap between high and low frequency processing circuits. In addition to the frequency separation carried out by the circuits 36 and 37 two other functions are performed. Firstly, the speech signal is processed, as mentioned above, so that all maxima are positive and all minima are negative, and secondly, the signal and also a 180° phase shifted version are presented at the outputs of the circuits 36 and 37.

Only the low frequency branch of FIG. 4 will be further described since the high frequency branch is similar. The low frequency branch employs shift registers 38 and 39 as they delay line 11, but as has been explained, it is necessary in these circumstances to convert an analogue input waveform into two binary rectangular waveforms.

The method of using a shift register as a delay line is described in more detail below in connection with FIG. 9.

An analogue waveform from the low-frequency processing circuit 37 reaches a two-phase clipping circuit 32 which clips the negative going portions of the analogue waveform to provide a signal which goes positive only, and then again clips the negative going portions to provide another signal which is also positive going. These signals are applied to shift registers 38 and 39, respectively, which are controlled by clock pulses from a generator 18.

The shift registers 38 and 39 each have a plurality of output taps but for clarity the circuits connected to only one tap for each of the registers 38 and 39 are shown. These tappings are designated 41 and 42, respectively. The taps are arranged in equal delay pairs, one tap from each shift register. Each pair of taps is coupled to a subtractor circuit to provide an output waveform with three possible magnitudes, that is a ternary waveform, the subtractor circuit for the taps 41 and 42 being designated 44. Each subtraction circuit simply subtracts the instantaneous magnitude of one waveform from that of the other; for example by inverting one waveform and adding the other waveform to the inverted waveform. Each pair of tapping points, that is each delay, is associated with a correlator which receives the undelayed signal by way of a subtractor circuit 45, and a signal with the associated delay. Two of these correlators 43 and 46 are shown.

Each correlator circuit is a logical circuit which multiplies its input signals using the following truth table, Table 1:

TABLE 1

| 1st Input | 2nd Input | Output |
|---|---|---|
| +1 | 0 | 0 |
| +1 | +1 | +1 |

| | | |
|---|---|---|
| +1 | −1 | −1 |
| 0 | 0 | 0 |
| 0 | +1 | 0 |
| 0 | −1 | 0 |
| −1 | 0 | 0 |
| −1 | +1 | −1 |
| −1 | −1 | +1 |

It can be seen from this truth table that for two rectangular input waveforms the multiplier provides a further rectangular output waveform which is the product of the two input waverforms.

Each correlator is coupled by way of a capacitor integrator having a time constant giving integration over an interval which is up to four times the delay associated with that correlator. Each correlator is coupled to peak rectifier circuits which provide voltages proportional to the positive and negative going peaks of the correlation signal from the appropriate correlator. The peak rectifiers are coupled to subtractor circuits which subtract these voltages; for example by inverting one voltage and adding the other voltage and the inverted voltage. It will be seen that integration is continuous in such an arrangement, that is the output signal from the integrator has a value at any instant t which represents the integral of the input signal to the integrator taken over a time $t - T$ where T is an interval of fixed duration.

For clarity, only integrating capacitors 48 and 49, peak rectifier circuits 50 and 51, and subtraction circuits 52 and 53 associated with the correlators 46 and 43 are shown.

In an alternative arrangement the first integrator is followed by a second integrator integrating over the same period, and the second integrator is followed by the peak rectifiers. Both integrators may be capacitors.

A single integrator and peak rectifiers provide a slightly misleading output since the peak rectifiers must have a time constant of about 50 milliseconds which sometimes masks "faps of silence" between sounds lasting about 20 milliseconds to be detected. Such gaps are important in recognizing words.

By using two integrators the time constant of the peak rectifiers can be reduced to about 10 milliseconds allowing "gaps of silence" to be detected. The output from the peak rectifiers is also more accurate.

In operation the integrating capacitors, the peak rectifier circuits and the subtraction circuits, which are described in more detail below, provide signals which by their magnitude and sign indicate the frequency content of the speech input signal. In order to sharpen boundaries defining the presence or absence of a particular frequency, the output signals from the peak rectifiers are passed to a number of long-tailed pair circuits two of which 56 and 56' are shown. Each long-tailed pair circuit includes two transistors, and the output signals from three peak rectifier circuits are applied by way of resistances (not shown) which impart weightings to the input signals to the base of one transistor. In FIG. 5(*a*) the frequency characteristics 80, 81 and 82, of three correlation circuits are shown. By weighting the output characteristics 80, 81 and 82 by ratios −3, +1 and +1, respectively, and adding them together, the characteristic 83 in FIG. 5(*b*) is obtained.

The output signals of any number of peak rectifier circuits may be combined in this way, but combining two such signals has been found convenient.

Each long-tailed pair is associated with a boundary between frequencies in that its output, following the characteristic 83, is negative below a certain frequency and positive above it.

As has been mentioned, each vowel sound has two characteristic formants, and each of these formants has a frequency spread. Thus to identify a formant four frequency boundaries can be specified, that is the sound must have a low frequency formant between two low frequency boundaries and a high frequency formant between two high frequency boundaries. The values of these boundaries is a matter of experiment especially since for any particular vowel the high frequency boundaries need not be the same throughout the range between the low frequency boundary. One set of boundaries which has been found satisfactory over a wide range of pronunciation is given in Table 2:

TABLE 2

| Vowel | Low Frequency Boundaries C/S Lower – Upper | High Frequency Boundaries C/S Lower – Upper |
|---|---|---|
| b*or*t | 300 – 540 | 580 – 800 |
| b*o*t | 500 – 630 | 630 – 880 |
| b*er*t | 450 – 630 | 880 – 1480 |
| b*oo*t | 240 – 450 | 800 – 1640 |
| b*i*t | 400 – 540 | 1640 – 2490 |
| b*ee*t | 240 – 400 | 2220 – 4120 |
| b*e*t | 540 – 720 | 1640 – 2220 |
| b*a*t | 720 – 1040 | 1480 – 2220 |
| b*u*t | 720 – 1040 | 880 – 1480 |
| b*ar*t | 720 – 1040 | 600 – 1210 |

In Table 2 the consonants *b* and *t* have been added to clarify the pronunciation of the vowels.

The long-tailed pairs, one of which corresponds to each boundary in the table are connected to a group of AND gates two of which 54 and 55 are shown. There is one AND gate for each vowel sound coupled to four long-tailed pairs. If positive logic is used the outputs of the long-tailed pairs corresponding to the low and high frequency upper boundaries are inverted before application to the appropriate AND gate.

The opening of an AND gate indicates that a particular vowel is present, and the AND gates may therefore be coupled to operate further apparatus which requires the recognition of vowels.

It will be apparent to those skilled in the art that the block diagram of FIG. 4 can be put into practice using known circuits, but a number of circuits for certain parts of the block diagram will now be described in more detail.

The AGC circuit 34 (see FIG. 10) has two stages: first a feedback stage 81 in which the resistance of a metal oxide silicon transistor (MOST) 83 in series with an amplifier 84 is controlled by the output of the amplifier. This output is rectified by a transistor 85 and applied to the gate terminal of the MOST 83 to control its resistance. In a second stage 82 of the AGC circuit, the output signal from the first stage is peak rectified by transistors 86 and 87, and a capacitor 88 and then applied to control the resistance of a MOST 89 shunted across the output of the second stage. Thus the "feed forward" control provided by the MOST 89 keeps the peaks of for signal from the first stage at a constant value while preserving the remainder of the waveform without distortion in relation to the peaks. In FIG. 10 most biassing and decoupling connections are omitted for clarity, these connections being well known in the art.

The HF processing circuit 36 is shown in more detail in FIG. 6. It comprises four identical sections 57 to 60. Each of these sections include a differentiating circuit and an integrating circuit so that the input signal is first differentiated and then integrated, and the process is repeated four times. The differentiating circuit for the section 57 comprises the capacitor 62, the resistor 65, and a transistor 64, and the integrating circuit comprises the transistor 64 connected by way of a resistor 63 and a feedback capacitor 66 as a Miller integrator.

When a waveform having many maxima or minima such as for example the waveform of FIG. 7(*a*) is applied to the speech recognition apparatus it must be changed to be as shown in FIG. 7(*d*) where all the maxima are positive and all the minima are negative. In section 57 the differentiating circuit produces the waveform of FIG. 7(*b*) and the integrating circuit provides the waveform of FIG. 7(*c*). The general slope 67 of FIG 7(*a*) is reduced to the slope 68 of FIG. 7(*c*) due to known imperfections in the differentiation and integration. When this process is repeated in each section of the circuit 36 the waveform of FIG. 7(*d*) is obtained, provided component values are correctly chosen. Speech sounds do not of course have the waveform of FIG. 7(*a a*) but the above explanation is given so that an approximate idea of the workIng of the processing circuits 36 and 37 is obtained.

The time constants of the differentiating circuits and integrating circuits in the sections of the circuit 36 of FIG. 6 are such that the high frequency band is passed but the low frequency band is rejected. Similarly, for the processing circuit 37 the time constants are such that the low frequency band is passed and the high frequency band rejected.

The circuit 36 includes a transistor 67' which provides an in-phase and a 180° phase shifted signal at the output via emitter followers 67 and 68. Binary signals for the shift registers are obtained at the outputs of the clipping circuit 33. The processing circuit 37 has a similar stage to provide signals for the clipping circuit 32.

Each of the correlators in FIG. 4 comprises three long-tailed pair circuits which together make up a multiplier having the truth table of Table 1. Each long-tailed pair includes two transistors connected as the active element of a conventional long-tailed pair circuit. In the first long-tailed pair circuit, a constant current source is connected in the "tail;" the base of one transistor is connected to receive the first input, and the base of the other transistor is connected to a constant bias source. The second and third long-tailed pairs each have a different one of the transistors of the first circuit connected in their "tails." In the second and third circuits one transistor of each pair is connected to receive the second input, and the other transistor in each pair is connected to a constant bias source.

In operation conduction by one particular transistor in the second pair or by the corresponding transistor in the third pair indicates a ternary output value of "plus one," provided no other transistor in the second or third pair is conducting. Similarly conduction by the other transistor in the second or third pairs indicates a ternary output value of "minus one," again provided no other transistor in the second or third pair is conducting. Conduction by two or more transistors in the second or third pairs indicates an output value of "zero." Equal conduction by the transistors of the first pair, as happens when the first input is "zero," therefore ensures "zero" output, and since a "zero" second input causes equal conduction by the transistors of the second pair and/or those of the third pair, such an input also gives "zero" output. A first input of "plus one" causes one transistor only of the first pair to conduct while a first input of "minus one" causes other transistor only of the second pair to conduct. Thus in this situation either the transistors of the second pair of the transistors of the third pair are selected for possible conduction. Then, if the second input is "plus one" one transistor only of the second or third pair conducts depending on which pair has been selected by the first input, if the second input is "minus one" the other transistor only of the second or third pair conducts, again depending on which pair has been selected.

Each associated group of integrating capacitor, peak rectifiers and subtraction circuit of FIG. 4 has the circuit shown in FIG. 8. The output from the associated correlator is received at a terminal 70 and stored by an integrating capacitor 71 while it is passed by way of resistors 72 and 73 to transistors 74 and 75 which are biased to act as peak rectifiers. Capacitors 76 and 77 are therefore charged to voltages proportional to positive and negative peaks, respectively, of the signal applied at the terminal 70. The voltages stored by the capacitor 76 and 77 are applied by way of resistors 78 and 79 to an output terminal 80. Hence the capacitor voltages are subtracted from one another to provide the output signal at the terminal 80. As has been mentioned, the magnitude of this output signal is a close approximation to the integral over an integral number of cycles of the signal from the correlator.

The time constant associated with the capacitor 71 is equivalent to an integration time of four periods of the formant to be detected. The capacitors 76 and 77 have a comparable time constant, approximately 20 milliseconds, which is sufficient to provide storage for the correlation signal while it is interpreted.

Where the alternative arrangement mentioned above of using two integrating capacitors is employed a capacitor 71' shown with dotted connections is included. The capacitors 71 and 71' then have similar values but the capaçitors 76 and 77 are given shorter time constants.

Another embodiment of the invention based on FIG. 3 is shown in FIG. 9 where the delay lines 11 and 13 are formed by several component circuits. The apparatus of FIG. 9 employs shift registers as delay lines, but as has been explained, it is necessary in these circumstances to convert a ternary rectangular input waveform into two binary rectangular waveforms.

In FIG. 9 when a ternary waveform is applied at terminal 10 and reaches a two-phase clipping circuit 115 which clips the negative going portions of the ternary waveform to provide a signal which goes positive only, and which inverts the ternary waveform and clips the negative going portions to provide another signal which is also positive going. These signals are applied to shift registers 116 and 117, respectively, which are controlled by variable-frequency clock pulses from a generator 118. The outputs from the shift register 116 and 117 are subtracted from each other in a subtractor circuit 119 to provide the delayed signal for the multiplier 12. A further subtractor 20 subtracts the input signals to the delay lines shift registers 116 and 117 to provide the undelayed signal for the multiplier 12.

The multiplier 12 may, as before be the logical circuit described above.

The product from the multiplier 12 is passed to a further ternary to binary waveform converter 121 which is similar to the converter 115, and the outputs of the converter 121 are applied to shift registers 122 and 123 having tapping points after each stage. The tapping points are connected through resistors to summing junctions 124 and 125, and the signals produced at these summing junctions are subtracted from one another in a subtractor 126 to provide a ternary signal at the terminal 14. The shift registers 122 and 123 receive clock pulses by way of a frequency divider 127 which is set to divide the clock pulse frequency by two, thus giving a total delay in the shift registers 122 and 123 which is twice the delay in the shift registers 116 and 117.

Since integration of the correlation signal may be carried out over an interval which is any integral number, up to nine times the delay due to the shift registers 116 and 117, frequency divider 127 may divide by any number up to nine.

The apparatus of FIG. 9 may be used to detect the presence of a signal having a predetermined period by setting the clock generator 118 to provide a delay of half the predetermined period at the predetermined frequency, and detecting maximum output at the terminal 14. It is of course necessary to calibrate the apparatus by observing the output magnitude when the predetermined signal is applied. In addition, the repetition frequency of an applied waveform may be detected by varying the clock pulse frequency until maximum correlation is obtained as indicated by the maximum output at the terminal 14.

The apparatus of FIG. 9 may be modified, and used in speech recognition as part of the apparatus of FIG. 4. For example the circuit 115 of FIG. 9 may be used as the clipping circuit 32 of FIG. 4. Instead of having one tapping only, the shift registers 116 and 117 have a plurality of tappings corresponding to a delay of half a wavelength for each expected formant in vowel sounds. A plurality of subtractors and multipliers are also provided, corresponding tapping points from the register 116 and 117 being coupled to a subtractor and multiplier for each formant. Each branch consisting of a subtractor, multiplier 12 and integrator 13, connected to one tapping, is then as shown in FIG. 9, with the inputs for the subtractor 119 connected to the appropriate tappings rather than the end of the shift registers 116 and 117.

A similar modification according to FIG. 9 is then also made for the circuits in the high frequency branch of FIG. 4.

While specific circuits have been described for constructing the frequency analyzer according to the invention, and vowel recognition apparatus, it will be apparent that many suitable alternative circuits exist.

We claim:

1. Apparatus for detecting the presence of an oscillatory signal having a predetermined period, including two paths for an input signal to the apparatus such that the output signal from one of the paths is delayed in relation to the output signal from the other path by a predetermined interval, correlation means for correlating the output signals from the paths to provide a correlation signal, and integration means for integrating the correlation signal over an interval which equals an integral number, including one but less than 10 times the predetermined interval.

2. Apparatus according to claim 1 wherein the integration means continuously integrates the correlation signal over a said interval.

3. Apparatus according to claim 1, wherein the predetermined interval is equal to half the period of the signal to be detected.

4. Apparatus according to claim 1, wherein the means for integrating the correlation signal includes further delay means having a plurality of outputs and means for summing signals appearing at the outputs.

5. Apparatus according to claim 4, for detecting the presence of a ternary oscillatory signal having a predetermined period but only three possible magnitudes, wherein each delay means includes a ternary to binary converter for providing two binary signals each having only two possible magnitudes dependent on a ternary input signal, two shift registers each coupled to receive one of the binary signals, and means for combining the output signals from the shift registers to provide a ternary output signal.

6. Apparatus according to claim 1 wherein one of the paths includes delay means with its output coupled to the correlation means, and there is substantially no delay to signals reaching the correlation means by the other path.

7. Apparatus according to claim 6, including means for restricting input signals to the apparatus to signals whose periods are greater than the predetermined interval divided by one and a half.

8. Apparatus according to claim 6, including peak indicating means for providing first and second signals proportional to the positive and negative peak magnitudes of the signal from the integration means, and comparison means for comparing the magnitudes of the first and second signals to provide an output signal.

9. Apparatus according to claim 6, for detecting the presence of a ternary oscillatory signal having a predetermined period but only three possible magnitudes, wherein the delay means includes a ternary to binary converter for providing two binary signals each having only two possible magnitudes dependent on a ternary input signal, two shift registers each coupled to receive one of the binary signals, and means for combining the output signals from the shift registers to provide a ternary output signal.

10. Apparatus according to claim 8 wherein the comparison means includes a subtraction circuit for subtracting the output of one rectifier circuit from that of the other.

11. Apparatus according to claim 6, wherein the delay means has a plurality of output terminals at which in operation an input signal to the apparatus appears delayed by different intervals, each interval corresponding to half the period of a signal to be detected.

12. Apparatus according to claim 11, wherein the output terminals are coupled by way of a plurality of correlation means to a plurality of integration means, each output terminal being coupled to one correlation means and one integration means particular thereto.

13. Apparatus according to claim 12, including a number of peak indicating means and comparison means, one peak indicating means and one comparison means associated with each integrator means, each peak rectifier means being adapted to provide first and second signals proportional to the positive and negative peak magnitudes of the signal from the associated integration means and each comparison means being adapted to compare the magnitudes of the first and second signals.

14. Apparatus according to claim 13, for detecting the presence of a signal having a predetermined period in a speech waveform, including means coupled to the outputs of the comparison means, for determining whether a frequency falling between the frequency boundaries defining one formant of a vowel has been detected.

15. Apparatus according to claim 14, wherein the means for determining whether a frequency falls between two boundaries includes a plurality of combining means for weighting signals and adding the weighted signals, each combining means being coupled to receive signals from several of the comparison means.

16. Apparatus according to claim 11, wherein each correlation means is a multiplier or divider circuit.

17. Apparatus according to claim 16, for detecting the presence of a signal having a predetermined period in a complex waveform such as a speech waveform, including processing means, coupled to the input to the two paths for converting a complex waveform to a waveform in which all maxima have one polarity and all minima have the opposite polarity, and means for clipping the waveform so obtained.

18. Apparatus according to claim 17, wherein the processing means includes a plurality of alternate differentiating and integrating circuits connected in series.

19. Apparatus for detecting the presence of signals having different predetermined periods in a speech waveform, including first and second apparatuses each according to claim 17, wherein the first apparatus rejects high frequency speech signals and the second apparatus rejects low frequency speech signals.

20. Apparatus according to claim 19, wherein the first apparatus rejects speech signals having frequencies above 1,040 cycles per second, and the second apparatus rejects frequencies below 580 cycles per second.

21. Apparatus according to claim 16, for detecting the presence of a signal having a predetermined period in a speech waveform, including automatic gain control means coupled to the inputs of the two paths to pass signals for these paths, the automatic gain control means including a variable gain amplifier, and control means for deriving a control signal to control the gain of the variable gain amplifier in accordance with signals applied at the input to the variable gain amplifier.

22. Apparatus for detecting the presence of oscillatory signals having predetermined periods, including:

delay means having a plurality of output terminals, one associated with each signal to be detected, the delay imparted at each output terminal being equal to an integral multiple, including one, or half the period of the associated signal, a plurality of correlation means, one associated with and coupled to each output terminal of the said delay means, each correlation means also being coupled to the input of the delay means and being adapted to provide a correlation signal indicative of the correlation between the input signal to the delay means and the signal appearing at the output terminal associated with that delay means, and a plurality of integration means, one associated with each output terminal of the said delay means and coupled to the output of the correlation means associated with that terminal, and each integration means being adapted to integrate over an interval which equals in integral number times the delay imparted by the said delay means at the associated output terminal.

* * * * *